(12) United States Patent
Raiber et al.

(10) Patent No.: US 9,087,091 B2
(45) Date of Patent: Jul. 21, 2015

(54) DETERMINATION OF DIFFERENCES IN HIERARCHICAL DATA

(71) Applicants: Martin Raiber, Munich (DE); Jan Finis, Munich (DE); Robert Brunel, Heidelberg (DE)

(72) Inventors: Martin Raiber, Munich (DE); Jan Finis, Munich (DE); Robert Brunel, Heidelberg (DE)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 13/961,481

(22) Filed: Aug. 7, 2013

(65) Prior Publication Data

US 2015/0046464 A1 Feb. 12, 2015

(51) Int. Cl.
*G06F 17/30* (2006.01)

(52) U.S. Cl.
CPC .................................. *G06F 17/30327* (2013.01)

(58) Field of Classification Search
CPC combination set(s) only.
See application file for complete search history.

(56) References Cited

U.S. PATENT DOCUMENTS

2006/0288275 A1* 12/2006 Chidlovskii et al. .......... 715/513
2011/0173189 A1* 7/2011 Singh et al. .................... 707/722
2011/0252310 A1* 10/2011 Rahaman et al. ............. 715/255

OTHER PUBLICATIONS

Jan P. Finis et al. RWS-Diff: Flexible and Efficient Change Detection in Hierarchical Data. Oct. 2013, CIKM '13, Proceedings of the 22nd ACM International Conference on Information and Knowledghe Mangement.*

Lee, Kyong-Ho et al., "An Efficient Algorithm to Compute Differences between Structured Documents", IEEE Transactions on Knowledge and Data Engineering, vol. 16, No. 8, Aug. 2004 (pp. 965-979, 15 pages total).
Guha, Sudipto et al., "Approximate XML Joins", ACM SIGMOD Jun. 4-6, 2002, Madison, Wisconsin, USA, 12 pgs.
Chawathe, Sudarshan S. et al., "Change Detection in Hierarchically Structured Information", In Proceedings of the ACM SIGMOD International Conference on Management of Data, 1996 (pp. 1-31, 31 total pages).
Nistér, David et al., "Scalable Recognition with a Vocabulary Tree", Proceedings of the 2006 IEEE Computer Society Conference on Computer Vision and Pattern Recognition (CVPR '06), © 2006 IEEE, 8 pgs.
Kalnis, Panos et al., "Similarity Evaluation on Tree-structured Data", SIGMOD 2005 Jun. 14-16, 2005, Baltimore, Maryland, USA, 12 pgs.
Zhang, Kaizhong et al., Simple Fast Algorithms for the Editing Distance between Trees and Related Problems © 1989 Society for Industrial and Applied Mathematics, vol. 18, No. 6, pp. 1245-1262, Dec. 1989 (18 pages total).
Zhang, Kaizhong et al., "Some MAX SNP-hard results concerning unordered labeled trees", Information Processing Letters 49 (1994) 249-254, © 1994 Elsevier Science B.V. (6 pages total).

(Continued)

*Primary Examiner* — Etienne Leroux
(74) *Attorney, Agent, or Firm* — Buckley, Maschoff & Talwalkar LLC

(57) ABSTRACT

A system includes determination of a first tree comprising a first hierarchy of nodes and a second tree comprising a second hierarchy of nodes, determination of first subtrees of the first tree which are identical to first subtrees of the second tree, generation of a first mapping between nodes of the first subtrees of the first tree and nodes of the first subtrees of the second tree, generation of a first feature vector for each of second subtrees of the first tree, insertion of the first feature vectors into an index structure, generation of a second feature vector for each of second subtrees of the second tree, and generation of a second mapping between nodes of second subtrees of the first tree and nodes of the second subtrees of the second tree based on the second feature vectors and the index structure.

18 Claims, 8 Drawing Sheets

(56) References Cited

OTHER PUBLICATIONS

Hedeler Cornelia, et al., "A Comparative Evaluation of XML Difference Algorithms with Genomic Data", Springer-Verlag Berlin Heidelberg, 2008, SSDBM 2008, LNCS 5069 (pp. 258-275, 18 total pages).

Xyleme, Lucie: "A dynamic warehouse for XML data of the Web", Mar. 2001, 8 pgs.

Lindholm, Tancred: "A Three-way Merge for XML Documents", 2004, DocEng '04, Oct. 28-30, 2004, Milwaukee, Wisconsin, USA, 10 pgs.

Dulucq, Serge et al., "Analysis of tree edit distance algorithms", 14th Annual Symposium, Jun. 25-27, 2003, Proceedings, (pp. 83-95, 13 total pages).

Lee, Kyong-Ho et al., "An Efficient Algorithm to Compute Differences between Structured Documents", IEEE Transactions on Knowledge and Data Engineering, vol. 16, No. 8, Aug. 2004, (pp. 965-979, 15 pages total).

Demaine, Erik D. et al., "An Optimal Decomposition Algorithm for Tree Edit Distance", 34th International Clloquium, ICALP 2007, Jul. 9-13, 2007, (1-20, 20 pages total).

Augsten, Nikolaus et al., "Approximate Joins for Data Centric XML", IEEE 24th International Conference on Data Engineering, Apr. 7-12, 2008, 10pgs.

Guha, Sudipto et al., "Approximate XML Joins", ACM SIGMOND '2002 Jun. 4-6, Madison, Wisconsin, USA, 12 pgs.

Song, Yang et al., "BioDIFF: An Effective Fast Change Detection Algorithm for Genomic and Proteomic Data", CIKM'04, Nov. 8-13, 2004, Washington, DC, USA (pp. 146-147, 2 pages total).

Chawathe, Sudarshan S. et al., "Change Detection in Hierarchically Structured Information", In Proceedings of the ACM SIGMOND International Conference on Management of Data, 1996 (pp. 1-31, 31 total pages).

Apostolico, Alberto et al., "Combinatorial Pattern Matching", 13th Annual Symposium, CPM 2002, Fukuoka, Japan, Jul. 3-5, 2002 Proceedings, LNCS 2375, 298 pages.

Chawathe, Sudarshan S. et al., "Comparing Hierarchical Data in External Memory", Proceedings of the 25th VLDB Conference, Endingurgh, Scotland, 1999, 12 pgs.

Klein, Philip N.: "Computing the Edit-Distance Between Unrooted Ordered Trees", NSF Grant CCR-9700146, ESA '98, LNCS 1461, 1998 (91-102, 12 pages total).

Cobena, Gregory et al., "Detecting Changes in XML Documents", Proceedings 18th International Conference on Data Engineering, 2002, 12 pgs.

Shasha, Dennis et al., "Exact and Approximate Algorithms for Unordered Tree Matching", IEEE Transactions on Systems, Man, and Cybernetics, vol. 24, No. 4, Apr. 1994 (pp. 668-678, 11 pages total).

Xu, Haiyuan et al., "KF-Diff+: Highly Efficient Change Detection Algorithm for XML Documents", Springer-Verlag Berlin Heidelberg, 2002 (pp. 1273-1286, 14 pages total).

Boyer, Laurent et al., "Learning Metrics between Tree Structured Data: Application to Image Recognition", 18th European Conference on Machine Learning (ECML), Sep. 2007, Warsaw, Poland, Springer, LNAI 4701, HAL Id: hal-00165954, https://hal.archives-ouvertes.fr/hal-00165954, 13 pgs.

Pauleve, Loic et al., "Locality sensitive hashing: a comparison of hash function types and quering mechanisms", Pattern Recognition Letters, Elsevier, 2010, 31 (11), <10.1016/j.patrec.2010.04.004>, <inria-00567191>, HAL Id: inria-00567191, https://hal.inria.fr/inria-00567191, 13 pgs.

Chawathe, Sudarshan S. et al., "Meaningful Change Detection in Structured Data", In Proceedings of the 1997 ACM SIGMOND International Conference on Management of Data, ACM Press, 1997, 30 pgs.

Lowe, David G. et al., "Object Recognition from Local Scale-Invariant Features", Proceedings of the International Conference on Computer Vision, Corfu (Sep. 1999), 8 pgs.

Fredman, Michael L., "On Computing the Length of Longest Increasing Subsequences", Discrete Mathematics 11, 1975 29-35, © North-Holland Publishing Company (7 pages total).

Chawathe, Sudarshan S. et al., "Representing and Querying Changes in Semistructed Data", ICDE '98 Proceedings of the Fourtheen International Conference on Data Engineering, 1998, 23 pgs.

Pawlik, Mateusz et al., "RTED: A Robust Algorithm for the Tree Edit Distance", Free University of Bozen-Bolzano, Bolzano, Italy, arXiv:1201.0320v1 [cs.DB] Dec. 31, 2011, 334-345 (12 pages total).

Nistér, David et al., "Scalable Recognition with a Vocabulary Tree", Proceedings of the 2006 IEEE Computer Society Conference on Computer Vision and Pattern Recognition (CVPR '06), ©2006 IEEE, 8 pgs.

Beis, Jeffrey S. et al., "Shape Indexing Using Approximate Nearest-Neighbour Search in High-Dimensional Spaces", IEEE Computer Society Conference on Computer Vision and Pattern Recognition, 1997, 7 pgs.

Kalnis, Panos et al., "Similarity Evaluation on Tree-structured Data", SIGMOND 2005 Jun. 14-16, 2005, Baltimore, Maryland, USA, 12 pgs.

Zhang, Kaizhong et al., Simple Fast Algorithms for the Editing Distance between Trees and Related Problems ©1989 Society for Industrial and Applied Mathematics, vol. 18, No. 6, pp. 1245-1262, Dec. 1989 (18 pages total).

Zhang, Kaizhong et al., "Some Max SNP-hard results concerning unordered labeled trees", Information Processing Letters 49 (1994) 249-254, ©1994 Elsevier Science B.V. (6 pages total).

Salton, Gerard et al., "Term Weighting Approaches in Automatic Text Retrieval", 87-881 Nov. 1987, Department of Computer Science—Cornell University, Ithaca, New York, 22 pgs.

Augsten, Nikolaus et al., "The pq-Gram Distance between Ordered Labeled Trees", ACM Transactions on Database Systems, vol. 35, Issue 1, Feb. 2010, pp. 1-35.

Selkow, Stanley M., "The Tree-to-Tree Editing Problem", Information Processing Letters, vol. 6, No. 6 Dec. 1977, 184-186 (3 pages total).

Rönnau, Sebastian et al., "Towards XML Version Control of Office Documents", DocEng '05, Nov. 2-4, 2005, Bristol, United Kingdom, Copyright 2005, 10-19 (20 pages total).

Barnard, David T., "Tree-to-tree Correction for Document Trees Technical Report 95-372", Jan. 1995, INRIA, Rocquencourt, France, 44 pgs.

Wang, Yuan et al., "X-Diff: An Effective Change Detection Algorithm for XML Documents", 19th International Converence on Data Engineering, 2003, 12 pgs.

Mouat, Adrian et al., "CS4 Dissertation XML Diff and Patch Utilities", Jun. 4, 2002, http://diffxml.sourceforge.net, 84 pgs.

Lindholm, Tancred, "XML Three-way Merge as a Reconciliation Engine for Mobile Data", Copyright 2003, MobiDE'03, Sep. 19, 2003, San Diego, California, USA, 5 pgs.

\* cited by examiner

Algorithm 1 $generateEditScript(A, B, M)$

1: for all nodes $b$ of $B$ in preorder do
2:     if $\nexists a.(b, a) \in M$ then
3:         Emit $insertLeaf(label(b), M(parent(b)), pos(b))$
4:     else
5:         $a \leftarrow M(b)$
6:         if $\exists b'.(b', a) \in M \wedge pre(b') < pre(b)$ then
7:             Emit $copy(a, M(parent(b)), pos(b))$
8:         else if $M(parent(b)) \neq parent(a)$ then
9:             Emit $move(a, M(parent(b)), pos(b))$
10:         if $label(b) \neq label(a)$ then
11:             Emit $rename(a, label(b))$
12: for all nodes $a$ of $A$ in postorder do
13:     if $\nexists b.(b, a) \in M$ then
14:         Emit $deleteLeaf(a)$

*FIG. 5*

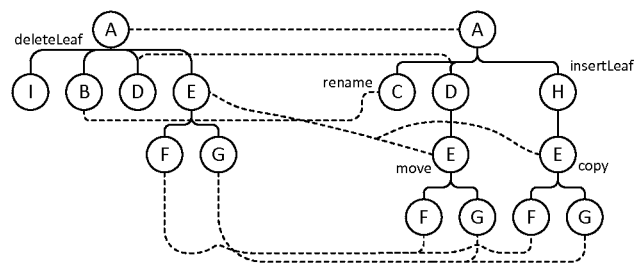

*FIG. 6*

DETERMINATION OF DIFFERENCES IN HIERARCHICAL DATA

BACKGROUND

Many business operations feature hierarchical data. For example, business users need to manage human resource (HR) hierarchies, which model the relationship between employees. When hierarchical data changes or versions of a data item are independently modified, it is useful to compute the differences between the old and new hierarchical data in order to reconcile or display the changes. The changes are often expressed as a so-called edit script: a compact sequence of operations that transforms one tree of hierarchical data into another. A sequence of edit scripts may therefore represent the version history of given hierarchical data.

BRIEF DESCRIPTION OF THE DRAWINGS

FIG. 5 illustrates an algorithm to generate an edit script from an edit mapping according to some embodiments.

FIG. 6 illustrates edit script operations according to some embodiments.

DESCRIPTION

The following description is provided to enable any person in the art to make and use the described embodiments. Various modifications, however, will remain readily apparent to those in the art.

Some prior systems for determining differences in hierarchical data use relatively simple matching algorithms which start either at the root of the hierarchical data (top-down) or at the leaves of the hierarchical data (bottom-up). The matching continues as long as identical nodes or subtrees are found. These systems rely heavily on the matching of large subtrees and fail if no such matches exist.

Figure 1:
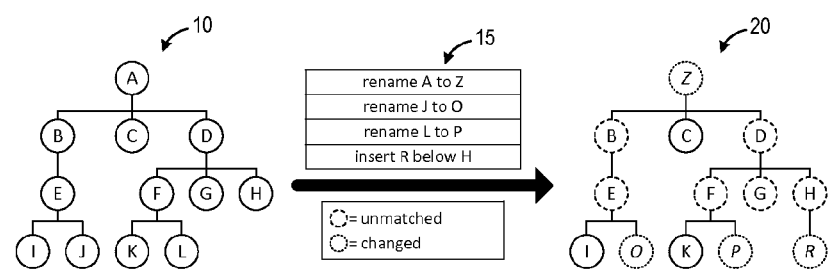
FIG. 1 illustrates changes to a hierarchy of nodes.

FIG. 1 illustrates tree 10, which has undergone the changes listed in table 15 to result in tree 20. Top-down matching of the changes fails to match any node since the root labels (i.e., A and Z) differ. Bottom-up matching can only match single leaf nodes (I, C, K), although many inner nodes are unchanged. The changes in the leaves alter their corresponding subtrees and therefore prevent subtree matching. Such changes in leaf nodes occur frequently, for example, within files of a file system and text values in an XML document.

Some embodiments provide a novel robust algorithm for determining and expressing tree differences, which supports both node and subtree edits. According to some embodiments, each subtree is represented by a d-dimensional feature vector using random walks. This representation allows the use of well-established indexes for similarity search in d-dimensional space to find similar subtrees.

Figure 2:
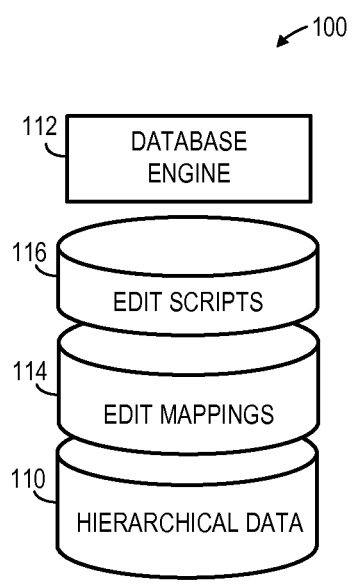
FIG. 2 is a block diagram of a computing system according to some embodiments.

FIG. 2 is a block diagram of database 100 according to some embodiments. FIG. 2 represents a logical architecture for describing systems according to some embodiments, and actual implementations may include more or different components arranged in other manners.

Database 100 may comprise any query-responsive data source or sources that are or become known, including but not limited to a structured-query language (SQL) relational database management system. Database 100 may comprise a relational database, a multi-dimensional database, an eXtendable Markup Language (XML) document, or any other data storage system storing structured and/or unstructured data. The data of database 100 may be distributed among several relational databases, multi-dimensional databases, and/or other data sources. Embodiments are not limited to any number or types of data sources. For example, database 100 may comprise one or more OnLine Analytical Processing (OLAP) databases (i.e., cubes), spreadsheets, text documents, presentations, etc.

Database 100 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, the data of database 100 comprises one or more of conventional tabular data, row-based data stored in row format, column-based data stored in columnar format, and object-based data. Database 100 may also or alternatively support multi-tenancy by providing multiple logical database systems which are programmatically isolated from one another. Moreover, the data of database 100 may be indexed and/or selectively replicated in an index to allow fast searching and retrieval thereof.

Database 100 may store metadata describing regarding the structure, relationships and meaning of the data stored within database 100. This information may include data defining the schema of database tables stored within database 100. A database table schema may specify the name of the database table, columns of the database table, the data type associated with each column, and other information associated with the database table.

Database 100 includes, among other data, hierarchical data 110. Hierarchical data 110 may be represented as trees of nodes. Hierarchical data 110 may be modified, and the prior versions may be maintained within database 100. For example, conserving database versions allows the execution of queries not only on the latest state of the database but also on older states.

Database engine 112 performs administrative and management functions for database 100. Such functions may include snapshot and backup management, indexing, optimization, garbage collection, and/or any other database functions that are or become known. For example, database engine 112 may operate as described herein to generate edit mappings 114 and edit scripts 116.

An edit mapping 114 maps nodes between two trees of hierarchical data and thereby expresses differences between the trees. The edit mapping M between a tree A that should be transformed into tree B is a function from the nodes of B to the nodes of A. The function is partial and neither injective nor surjective, that is, not all nodes of B or A need to be mapped and a node of A can be the image of multiple nodes of B. According to some embodiments for expressing differences between two trees, an edit mapping 114 is initially generated and an edit script 116 is then inferred from the mapping.

For a pair of input trees A and B, an edit script 116 is a sequence of edit operations that transforms tree A into tree B. The edit script 116 is computed using a tree difference algorithm.

A tree difference algorithm according to some embodiments operates on all rooted, labeled trees with a (non-strict) order defined on the labels (i.e., the labels can be sorted and compared for equality) and a hash function that maps labels to numeric values. The algorithm can be configured for both ordered trees (where the sibling order matters) and unordered trees. The sibling order is not related to the label order.

The labels may carry application specific-data. XML nodes, for example, may be labeled with element tags or text content, but more complex labels are also possible. An algorithm according to some embodiments may be used in a range of scenarios such as, but not limited to, HTML documents, XML documents, file systems, or RNA secondary structures.

Some embodiments allow edit operations on both nodes and subtrees. For two nodes a and a' in tree A, the following edit operations are allowed in an edit script according to some embodiments:

rename(a,l): Changes the label of node a to l.
insertLeaf(l,a,i): Inserts a new leaf node with label l as a new child of node a before the i-th child of a.
deleteLeaf(a): Removes leaf node a.
insertSubtree(S,a,i): Inserts a new subtree S before the i-th child of node a.
deleteSubtree(a): Removes the subtree rooted in node a, that is, a and all its descendants.
move(a,a',i): Removes the subtree rooted in a and insert it before the i-th child of a'.
copy(a,a',i): Inserts a copy of the subtree rooted in a before the i-th child of a'.

The child position i is omitted in the case of unordered trees. Tree A is extended with a dummy parent node for the root node to also allow all edit operations on the root node. Subtree edit operations are allowed, which lead to compact and intuitive edit scripts that can be applied quickly. For example, moving a chapter of a document in one step is faster and more expressive than deleting all sections and paragraphs and reinserting them at their individual target positions. Node insertion and deletion are defined on leaf nodes; a non-leaf node is deleted by first moving all its children (with their subtrees) to its parent.

The tree difference algorithm described herein can be configured to work with either the ordered or the unordered version of the edit operations. Further, the operations for copying, inserting, and deleting subtrees can be switched off, in which case they are expressed by other operations. A cost may be assigned to each edit operation, with the goal of generating an edit script whose operations reflect the lowest total cost.

An edit mapping which maps as many nodes as possible and maps nodes which are very similar to each other will result in a small edit script. A perfect mapping would be one that produces a cost-minimal edit script. Some embodiments generate an approximate cost-minimal edit mapping and a corresponding edit script.

Figure 3:
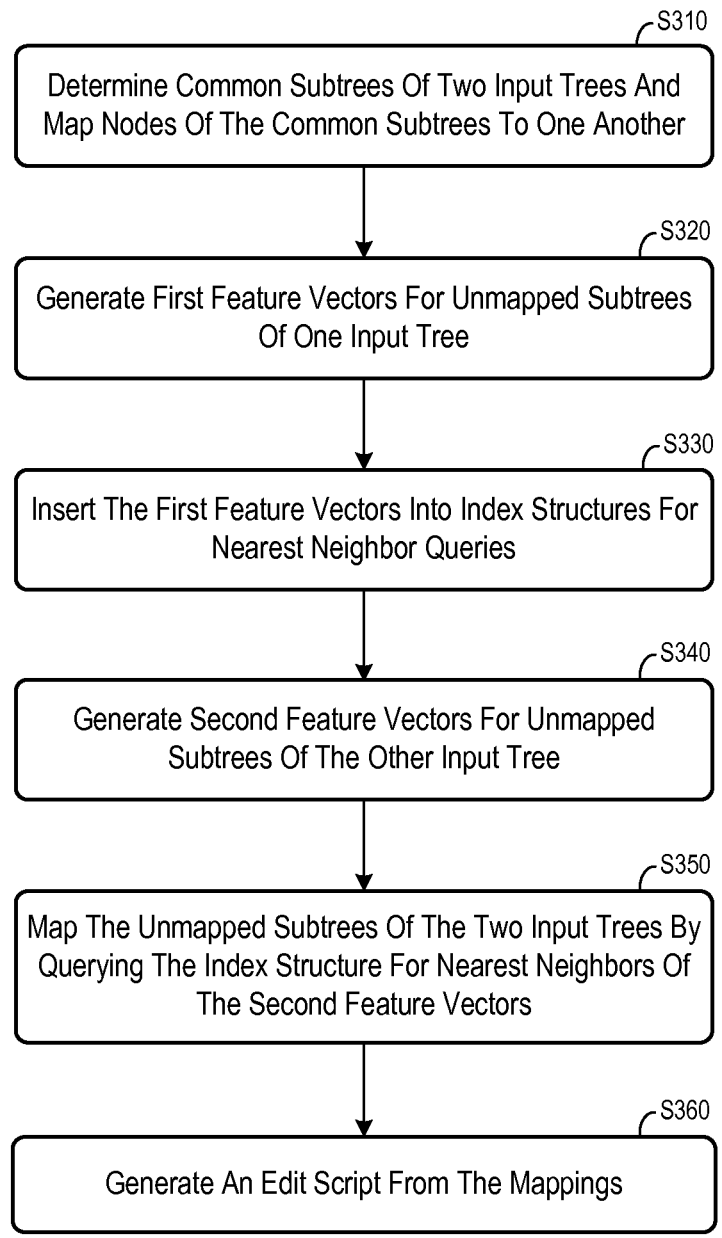
FIG. 3 is a flow diagram of a process according to some embodiments.
Figure 4:
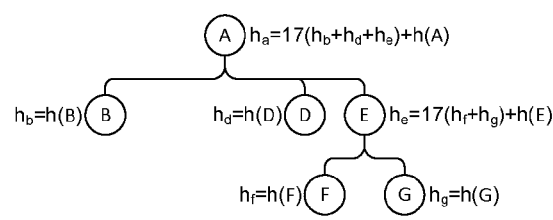
FIG. 4 illustrates sibling order-invariant subtree hashes according to some embodiments.

FIG. 3 comprises a flow diagram of process 300 according to some embodiments. In some embodiments, various hardware elements (e.g., processors) of database 100 execute program code to perform process 300. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, common structures of two input trees are determined and the nodes of the common structures are mapped to one another. The goal of S310 is not to find all possible mappings but to find ones mappings which are easy to compute. According to some embodiments, S310 includes top-down matching or matching using subtree hashes. Any other suitable methods that are or become known may be utilized at S310.

Top-down matching between trees A and B, each consisting of a hierarchy of nodes, starts at the roots of trees to be compared and maps nodes having a same label (e.g., Node "N") to each other. If a node is mapped and is not a leaf node, the same matching method is recursively applied to its children. If more than one sibling has the same label, we do not map it in this step, since we might map the wrong pairs of nodes. When using this method, if a node's label is changed, the whole subtree rooted in this node is not mapped.

Alternatively, hash matching between trees A and B is performed bottom-up by calculating a hash value of each unmapped subtree in A and inserting the value into a hash table. Then, the unmapped subtrees of B are hashed and the hash table is probed to find equivalent subtrees in A. For unordered trees, a position-independent hash function is used. Because addition is a commutative operator, simply adding the hash of the node label and the hash values of all children multiplied with a prime number is position-independent (cf., FIG. 2). For ordered trees, it suffices to multiply the hash of each child with a prime number that is different for each child position.

Using hash matching and top-down matching, a large portion of the tree nodes may be mapped if there are a moderate number of differences between the two trees (which is usually the case). Top-down matching finds all paths from the root that have not changed. Hash matching finds smaller subtrees which have not changed. However, the quality of the resulting mapping is usually not sufficient because these simple matching methods are not robust. For example, renaming the root disables top-down matching and a single renaming in a node or insertion of a node disables hash matching for all subtrees that contain this node. Since such "non-structural" edit operations disable the above-described matching methods, embodiments also include a method for finding trees that are similar but not equal.

More specifically, some embodiments find trees that are not necessarily equal but similar and thus are missed by the above-described matching approaches. According to some embodiments, each subtree is represented by a d-dimensional feature vector (with fixed d) that constitutes a random walk in d-dimensional space. The random walks are generated in a way that ensures that their squared euclidean distance, referred to herein as random walk distance (RWD), is approximately proportional to the edit distance of the corresponding trees.

Similar subtrees in trees A and B are therefore found by generating all feature vectors for subtrees in A at S320 and inserting these vectors into an index structure for d-dimensional nearest neighbors queries at S330. If the "copy" operation is allowed, all subtrees are inserted, because even already mapped subtrees could be mapped again for a copy. Otherwise, only subtrees with an unmapped root are inserted. Then, feature vectors for all unmapped subtrees in B are generated at S340.

Next, at S350, tree B is iterated over in preorder and, for each unmapped subtree b, its feature vector is used to probe into the index structure to find the l (with fixed l) nearest neighbors which are candidates for being similar. l>1 neighbors are retrieved because a low RWD does not always (but often does) imply a similarity in the subtrees (i.e., false positives are possible). Therefore, the f, nearest neighbors in the feature vector space are merely used as mapping candidates and the one with the least edit distance is used, or none is used if all are false positives (which should happen infrequently due to the stochastic properties of the RWD). For a similarity comparison of the l mapping candidates at S350, an iterative deepening top-down matching is used that stops after a fixed number of compared nodes and is thus in O(1). Although the premature stopping might reduce approximation quality, it serves to meet log-linear runtime bounds.

If the copy operation is not allowed, candidates which have an already mapped root are skipped at s350. Once a best candidate subtree a for subtree b is determined, the roots of a and b are mapped and an ordinary top-down matching is performed starting from a and b to map cheaply as many descendants as possible. Afterwards, the preorder iteration over B is continued to map remaining subtrees.

Standard index structures may be used to efficiently find nearest neighbors in d-dimensional space. Some prominent indexing schemes include k-d trees, k-means locality-sensitive hashing (KLSH), and hierarchical k-means (HKM). Embodiments are not limited to these schemes.

An edit script is generated from the mappings at S360. n edit script is a sequence of edit operations which transforms tree A into tree B. FIG. 5 sets forth an algorithm which generates an edit script from an edit mapping which maps nodes of B to nodes of A, according to some embodiments. FIG. 6 illustrates an example for each kind of edit operation produced by the algorithm. The algorithm traverses all nodes of B in preorder, that is, parents are visited before their children. If a node b in B has no mapping (b,a) in M, b is inserted (Lines 2-3 of algorithm, node H in FIG. 6). If a mapping (b,a) exists, it is determined whether a node b' which maps to a has already been visited. The node b' is already visited if its preorder rank pre(b') is smaller than the preorder rank of b (Lines 4-6). If such a node exists, then subtree a has already been "used" and must be copied(Line 7, right node E); otherwise, it is determined whether the parents of the mapped nodes differ. If they do, node a is moved to its new parent (Lines 8-9, left node E). In addition to updating the node position, node a is renamed if the labels of the mapped nodes differ (Lines 10-11, node B→C). After the preorder iteration over B, a postorder iteration over A is performed and all nodes that are not mapped are deleted (Lines 12-14, node I).

Whenever an edit operation is emitted, it is applied to tree A and subsequent edit operations are defined on the new version of A. In addition, the mapping M is updated after each insertLeaf and copy operation with mappings to the newly added node(s). After executing the sibling order is adjusted for ordered trees at S360, which is separately discussed below.

Line 8 of the algorithm requires that M maps the parent of the current node b to some node of A. This is guaranteed by traversing B in preorder and updating the mapping after each insert operation. In the second phase of the algorithm (Lines 12-14), unmapped nodes in A are removed using the deleteLeaf operation, which requires the nodes to be leaves at the time of being removed. This holds since (a) the mapped child a of an unmapped node in A satisfies the condition in Line 8, that is, the subtree rooted in a is moved to a mapped parent in the first phase of the algorithm; and (b) the nodes of A are traversed in postorder, thus unmapped children are removed before their unmapped parents.

The algorithm of FIG. 5 does not produce subtree insertions and deletions. By generating the insertLeaf and deleteLeaf operations in preorder and postorder, respectively, it is ensured that all inserts and deletes that belong to the same subtree are adjacent in the edit script. We merge sequences of leaf insertions and deletions into subtree insertions and deletions in a simple postprocessing step. By omitting this step, subtree insertion and deletion can be switched off. Subtree copy is switched off by replacing all its occurrences in the edit script by the respective node or subtree insertions.

After executing the algorithm, A is identical to B except for the sibling order, and all nodes of A and B are mapped.

To fix the sibling order, the c children of each node in A are numbered with the sibling positions of the respective (mapped) nodes in B, that is, each child in A gets assigned a position between 1 and c. The longest increasing sub-sequence X of the position numbers is computed in o(clogc) time; all nodes that are not in X are moved to the right position by emitting moveSubtree operations.

As described above, to find similar subtrees rapidly, the information content of each subtree is reduced to a fixed-size d-dimensional feature vector and indexed d-dimensional nearest neighbors queries are used. To obtain the feature vector according to some embodiments, each subtree is first serialized into a "bag" of p,q-gram hashes. The more similar two trees are, the more hashes are equal. Each of the hashes becomes a step in a d-dimensional random walk and the final feature vector is the endpoint of the walk. Consequently, the more similar two trees are, the more steps in their random walks are equal and thus the distance of the random walk end points is smaller the more similar two trees are.

Grams (also shingles or tokens) are tree summaries that represent a tree by a set of small excerpts. Using such grams, the problem of finding similar subtrees is reduced to the problem of finding bags of grams with large intersections.

p,q-grams are besom-shaped subtrees consisting of q leaf nodes (called base) and a chain of p non-leaf nodes (called stem). In the original tree, the base nodes are siblings and the stem nodes their p closest ancestors. p,q-grams capture both ancestor and sibling relationships and can be made invariant to small order changes.

Figure 7:
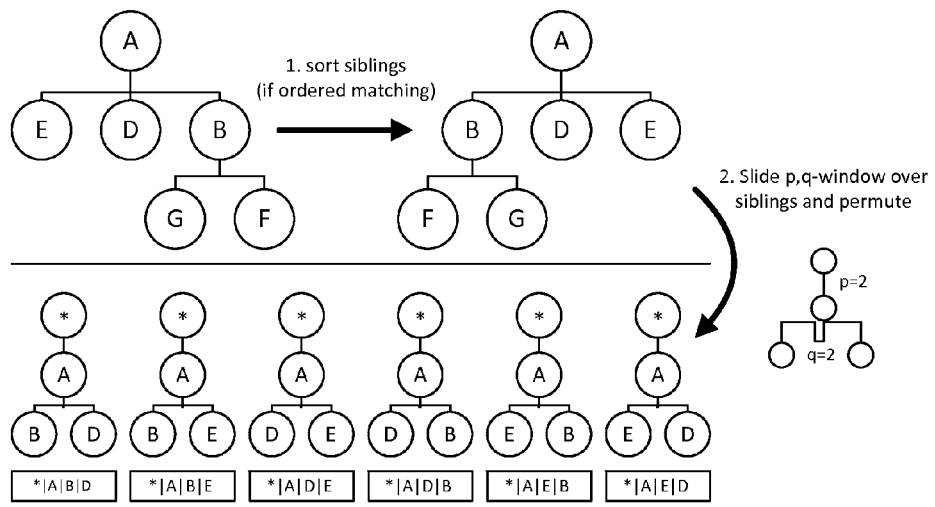
FIG. 7 illustrates partial construction of p, q grams according to some embodiments.

The p,q-grams for all subtrees of a tree of size n can be generated in o(n) time. FIG. 7 illustrates the p,q-gram construction for an example tree (p=q=2). In the first step, the tree is sorted lexicographically by labels (the sort order of identical labels is irrelevant for the p,q-gram construction). Next, for each node a in the tree, a window of size w≥q is slid over the children of the node and p,q-grams are produced. The bases are formed by the first node of each window and any sub-sequences of the remaining nodes in the window. If a node does not have enough ancestors or enough children, dummy nodes (labeled with an asterisk in the figure) are used to produce the p,q-grams. In FIG. 7, the sorting changes the order of the children of the node with label "A". The window size is w=3 and six bases are formed for three window positions (the window is wrapped around at the right border).

Invariance to order changes is obtained through sorting siblings. This way, the permutation of a constant amount of siblings changes only a constant amount of p,q-grams. The construction of the base using a window makes the p,q-grams robust to modifications that change the sort order of children, or "children error", while still capturing sibling relationships.

The "stem" captures ancestor relationships in the p,q-grams. If sibling permutations are not allowed (ordered trees), the trees are not sorted and windows of size q are used.

The p,q-grams are finally serialized into arrays of size p+q, which is straightforward due to the fixed shape of the p,q-grams. The bottom of FIG. 7 shows the serializations of the respective p,q-grams.

The similarity of two trees can now be expressed over their bags of p,q-grams. Let $b_A$ and $b_B$ be the bags of grams of tree A and B, respectively, then the symmetric bag difference $D(A,B)$ is defined as $|S_A \cup S_B| - 2|b_A \cap b_B|$. This difference directly reflects the number of elements we have to remove from A and add to B if we want to transform A to B and as such approximately reflects the required edit operations. It is a distance measure, that is, the distance $D(A,B)$ between identical sets is zero while the distance between entirely different sets is $|A|+|B|$.

Even though the comparison of trees may now be easier, the actual size of the tree representations has increased. If there are a and b unmapped subtrees in tree A and B, respectively, a×b bag differences have to be computed to find the best matches. Each of these computations has linear runtime in the bag sizes. To speed up the similarity search, the bag difference between any two bags are not explicitly calculated. Instead, each bag of grams is compressed to a fixed-size d-dimensional vector and then a nearest neighbors search is used in the d-dimensional space to find mapping candidates.

The d-dimensional feature vector for a tree A which has a bag of grams $b_A$ is generated as follows according to some embodiments: First, a hash value $h_g$ is computed for each p,q-gram g in the bag $b_A$. Then, $h_g$ is used to generate a random point $v_g$ on the d-dimensional unit sphere (e.g., use $h_g$ as seed for a random number generator that generates the vector components). To get the final feature vector $v_A$ for A, all the vectors $v_g$ are summed. To approximate the symmetric bag difference, the d-dimensional squared euclidean distance is used. The vector $v_A$ constitutes the end point of an d-dimensional random walk with $|b_A|$ steps of length one. Therefore, the resulting distance is called the random walk distance (RWD):

$$D(A,B) \approx RWD(A,B) = \|v_A - v_B\|^2 = v_A \cdot v_B$$

By using the random walk distance, the problem of finding similar subtrees is reduced to the problem of finding points which are close in euclidean space. This is a valid similarity measure: The more grams differ between the bags $b_A$ and $b_B$, the more steps from which $v_A$ and $v_B$ are assembled differ.

Figure 8:
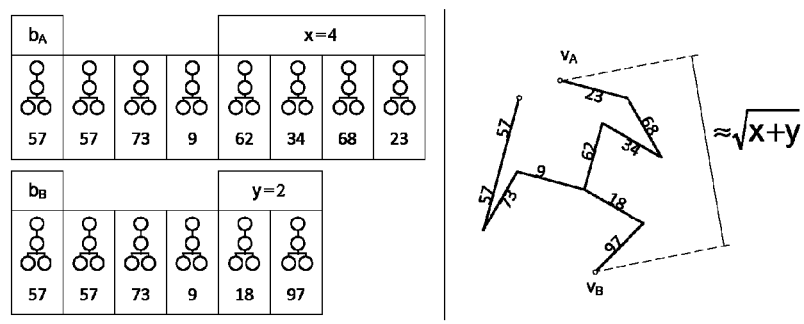
FIG. 8 illustrates transformation of bags of p, q grams into corresponding two-dimensional random walks according to some embodiments.

All grams that are in both bags $b_A$ and $b_B$ yield the exact same steps in the random walk. Consequently, these steps do not alter the distance at all. The number of remaining grams is $x=|b_A \setminus b_B|$ and $y=|b_B \setminus b_A|$ which constitute the two random walks whose squared euclidean distance is the RWD. The distance between the end points of two random walks with x and y steps is equal to the distance between the origin and an end point of a random walk with $z=D(A,B)=x+y$ steps. FIG. 8 shows the transformation of two bags of grams $b_A$ and $b_B$ into corresponding two-dimensional random walks $v_A$ and $v_B$. The numbers below the grams show their hash values. In this example, the trees have 4 common grams and 2+4=6 different grams. Thus, the expected euclidean distance is $\sqrt{6}$.

The RWD is only an approximation since random walks with totally different steps might end up at points that are close to each other. To argue that the measure is useful: Let $v = v_1 + \ldots + v_z$ be the endpoint of a random walk starting from the origin and taking z steps in d-dimensional space and let $RWD_z^d$ be the squared euclidean distance between the origin and v. For each step $v_i$, $E[v_i] = \vec{0}$, $|v_i|^2 = 1$ with all $v_i$ independent random variables. Then $RWD_z^d = |v|^2 = v \cdot v$. By expansion of the dot product, $$RWD_z^d = \sum_{i=1}^{z}(v_i)^2 + \sum_{k \neq \ell} v_k \cdot v_\ell. \tag{1}$$

With $$E[(v_i)^2] = 1$$

and $$E[v_k \cdot v_\ell] = E[v_k] \cdot E[v_\ell] = 0$$

for every $k \neq \ell$, $$E[RWD_z^d] = z = D(A,B)$$

Thus, the RWD is an approximation of the symmetrical bag distance regardless of the number of dimensions. The squared RWD is as follows:

$$(RWD_z^d)^2 = z_a^2 + 2z \sum_{k \neq \ell} v_k \cdot v_{\ell b} + \left(\sum_{k \neq \ell} v_k \cdot v_\ell\right)_c^2$$

and thus for the variance:

$$\mathrm{Var}[RWD_z^d] = E[a]_{=z^2} + E[b]_{=0} + E[c] - E[RWD_z^d]^2_{=z^2} = E[c]$$

and for E[c]:

$$E[c] = \sum_{k \neq \ell} \sum_{i \neq j} E[(v_k \cdot v_\ell)(v_i \cdot v_j)]$$

All terms with $\{k,l\} \neq \{i,j\}$ in this summation are zero. The remaining $2z(z-1)$ terms have a mean of $m = E[(v_i \cdot v_j)^2]$. Let the l-th component of vector $v_i$ be $v_i^l$. Due to independence of $v_i$ and $v_j$ and because $v_i$ and $v_j$ are equally distributed, the dot product can be expanded and simplified to $$m = \sum_{\ell=1}^{d} E[(v_i^\ell)^2]^2.$$

Since all d components $v_i^l$ identically distributed with $|v_i|^2=1$, $$E[(v_i^j)^2] = \frac{1}{d}$$

by symmetry and thus $$m = \frac{1}{d}.$$

Consequently $$\mathrm{Var}[RWD_z^d] = 2z(z-1)m = \frac{2z(z-1)}{d} \tag{2}$$

The first consequence of Equation 2 is that the number of dimensions reduces the variance and thus makes the approximation more precise. For an infinite number of dimensions, the RWD would even be exactly the symmetric bag difference. This implies that a high number of dimensions is desirable. However, a high number of dimensions makes computations more costly and renders the index structures that are used for the nearest neighbors search ineffective due to the curse of dimensionality. Hence, too many dimensions are prohibitive as well. Some embodiments obtain efficient results with $10 \leq d \leq 20$.

The second consequence of Equation 2 is that the variance is proportional to $z(z-1)$. Thus, the larger the distance, the less reliable the approximation is. In contrast, the RWD is a very reliable approximation for small distances. The nearest neighbors search is especially interested in points with a small distance. For these points, the RWD is very precise, so there are no false negatives. As mentioned, the problem of false positives is mitigated by choosing the best of l nearest neighbors. The stochastic properties of the d-dimensional random walk according to some embodiments make the RWD an excellent approximate distance measure for our purposes. While the RWD is defined as the squared euclidean distance since this is a direct approximation for the bag distance, the index structures use the usual euclidean distance.

The foregoing description assumes that each step in the random walk has a length of one. However, the grams may be weighted and the step length multiplied by that weight to give certain grams more or less significance. A general assumption is that having less frequent grams in common is more significant than having frequent grams in common. For example, in HTML documents, two subtrees having a br element in common are not that rare, while having a long text node in common which appears infrequently in the document is a strong indication of a correct mapping. Therefore, the inverse gram frequency, that is, the reciprocal value of the number of times a gram occurs in both trees, may be used as weight. Of course, more or less elaborate heuristics could be used to tune the random walk similarity.

Figure 9:
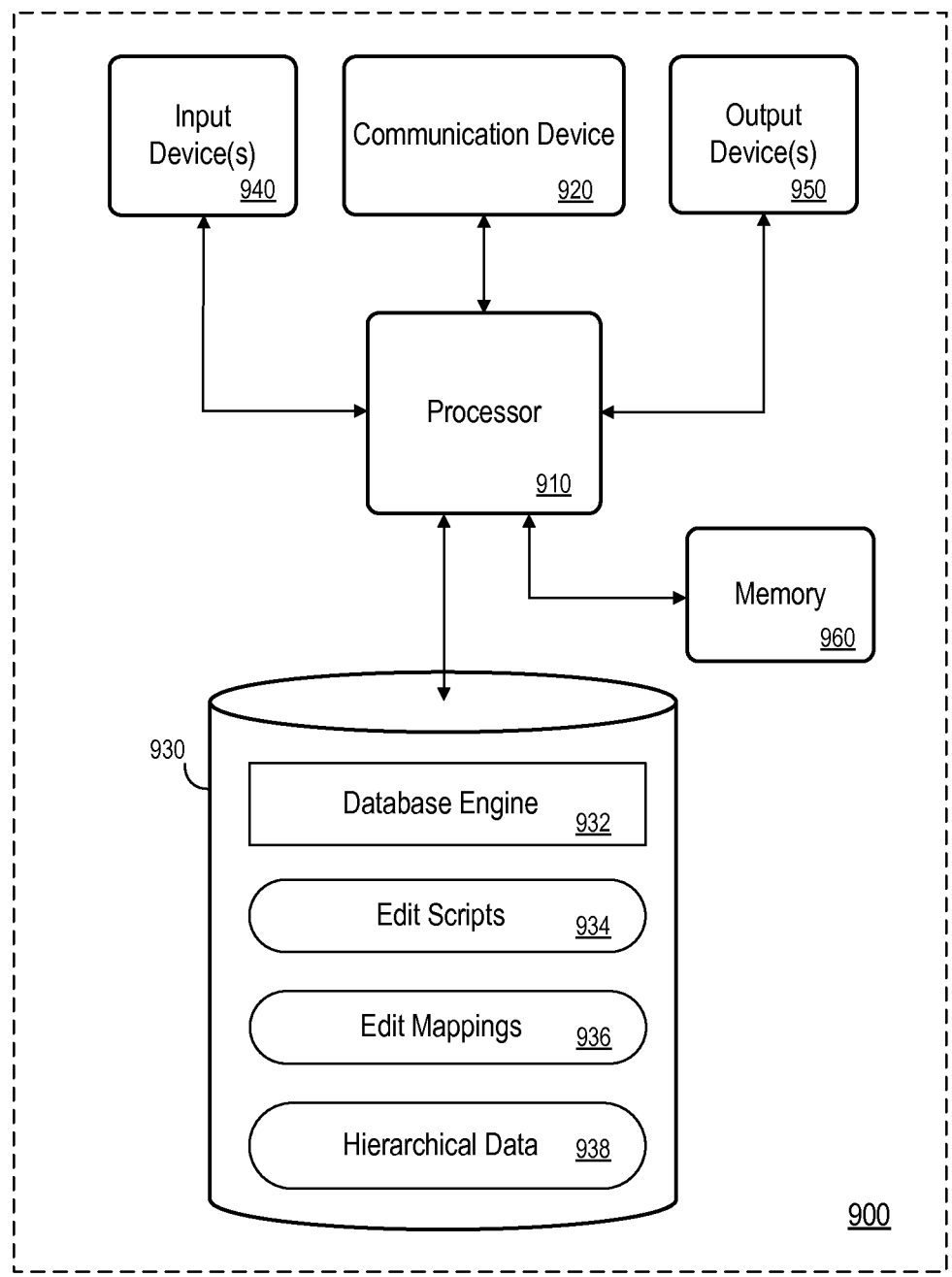
FIG. 9 is a block diagram of a computing system according to some embodiments.

FIG. 9 is a block diagram of system 900 according to some embodiments. System 900 may comprise a general-purpose computing system and may execute program code to perform any of the processes described herein. System 900 may comprise an implementation of database 100 according to some embodiments. System 900 may include other unshown elements according to some embodiments.

System 900 includes processor 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Database engine 932 may comprise program code executed by processor 910 to cause apparatus 900 to perform any one or more of the processes described herein. Embodiments are not limited to execution of these processes by a single apparatus. edit scripts 934, edit mappings 936 and hierarchical data 938 may be implemented as described above. As also described above, database 100 may be implemented using volatile memory such as memory 960. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
a memory storing processor-executable program code; and
a processor to execute the processor-executable program code in order to cause the computing system to:
determine a first tree comprising a first hierarchy of nodes and a second tree comprising a second hierarchy of nodes;
determine first subtrees of the first tree which are identical to first subtrees of the second tree;
generate a first mapping between nodes of the first subtrees of the first tree and nodes of the first subtrees of the second tree;
generate a first feature vector for each of second subtrees of the first tree;
insert the first feature vectors into an index structure;
generate a second feature vector for each of second subtrees of the second tree; and
generate a second mapping between nodes of second subtrees of the first tree and nodes of the second subtrees of the second tree based on the second feature vectors and the index structure.

2. A computing system according to claim 1, the processor to further execute the processor-executable program code in order to cause the computing system to:
generate an edit script of operations to transform the first tree to the second tree based on the first mapping and the second mapping.

3. A computing system according to claim 1, wherein generation of the second mapping comprises:
querying of the index structure for nearest neighbors of each of the second feature vectors.

4. A computing system according to claim 3, wherein generation of a first feature vector for each of second subtrees of the first tree comprises:
serialization of each of the second subtrees of the first tree into a first respective bag of grams, and
wherein generation of a second feature vector for each of second subtrees of the second tree comprises:
serialization of each of the second subtrees of the second tree into a second respective bag of grams.

5. A computing system according to claim 1, wherein generation of a first feature vector for each of second subtrees of the first tree comprises:
serialization of each of the second subtrees of the first tree into a respective bag of grams; and
for each of the bags of grams corresponding to the second subtrees of the first tree, generate a fixed-size d-dimensional vector, and
wherein generation of a second feature vector for each of second subtrees of the second tree comprises:
serialization of each of the second subtrees of the second tree into a second respective bag of grams; and
for each of the second bags of grams corresponding to the second subtrees of the second tree generate a second fixed-size d-dimensional vector.

6. A computing system according to claim 1, wherein generation of the second mapping comprises:
determination of distances between end points of the fixed-size d-dimensional vectors and end points of the second fixed-size d-dimensional vectors.

7. A non-transitory computer-readable medium storing program code, the program code executable by a processor of a computing system to cause the computing system to:
determine a first tree comprising a first hierarchy of nodes and a second tree comprising a second hierarchy of nodes;
determine first subtrees of the first tree which are identical to first subtrees of the second tree;
generate a first mapping between nodes of the first subtrees of the first tree and nodes of the first subtrees of the second tree;
generate a first feature vector for each of second subtrees of the first tree;
insert the first feature vectors into an index structure;
generate a second feature vector for each of second subtrees of the second tree; and
generate a second mapping between nodes of second subtrees of the first tree and nodes of the second subtrees of the second tree based on the second feature vectors and the index structure.

8. A non-transitory computer-readable medium according to claim 7, the program code executable by a processor of a computing system to cause the computing system to:
generate an edit script of operations to transform the first tree to the second tree based on the first mapping and the second mapping.

9. A non-transitory computer-readable medium according to claim 6, wherein generation of the second mapping comprises:
querying of the index structure for nearest neighbors of each of the second feature vectors.

10. A non-transitory computer-readable medium according to claim 9, wherein generation of a first feature vector for each of second subtrees of the first tree comprises:
serialization of each of the second subtrees of the first tree into a first respective bag of grams, and
wherein generation of a second feature vector for each of second subtrees of the second tree comprises:
serialization of each of the second subtrees of the second tree into a second respective bag of grams.

11. A non-transitory computer-readable medium according to claim 7, wherein generation of a first feature vector for each of second subtrees of the first tree comprises:
serialization of each of the second subtrees of the first tree into a respective bag of grams; and
for each of the bags of grams corresponding to the second subtrees of the first tree, generate a fixed-size d-dimensional vector, and
wherein generation of a second feature vector for each of second subtrees of the second tree comprises:
serialization of each of the second subtrees of the second tree into a second respective bag of grams; and
for each of the second bags of grams corresponding to the second subtrees of the second tree generate a second fixed-size d-dimensional vector.

12. A non-transitory computer-readable medium according to claim 7, wherein generation of the second mapping comprises:
determination of distances between end points of the fixed-size d-dimensional vectors and end points of the second fixed-size d-dimensional vectors.

13. A computer-implemented method comprising:
determining a first tree comprising a first hierarchy of nodes and a second tree comprising a second hierarchy of nodes;
determining first subtrees of the first tree which are identical to first subtrees of the second tree;
generating a first mapping between nodes of the first subtrees of the first tree and nodes of the first subtrees of the second tree;
generating a first feature vector for each of second subtrees of the first tree;
inserting the first feature vectors into an index structure;
generating a second feature vector for each of second subtrees of the second tree; and
generating a second mapping between nodes of second subtrees of the first tree and nodes of the second subtrees of the second tree based on the second feature vectors and the index structure.

14. A computer-implemented method according to claim 13, further comprising:
generating an edit script of operations to transform the first tree to the second tree based on the first mapping and the second mapping.

15. A computer-implemented method according to claim 13, wherein generating the second mapping comprises:
querying the index structure for nearest neighbors of each of the second feature vectors.

16. A computer-implemented method according to claim 15, wherein generating a first feature vector for each of second subtrees of the first tree comprises:
serializing each of the second subtrees of the first tree into a first respective bag of grams, and
wherein generating a second feature vector for each of second subtrees of the second tree comprises:
serializing each of the second subtrees of the second tree into a second respective bag of grams.

17. A computer-implemented method according to claim 13, wherein generating a first feature vector for each of second subtrees of the first tree comprises:
serializing each of the second subtrees of the first tree into a respective bag of grams; and
for each of the bags of grams corresponding to the second subtrees of the first tree, generating a fixed-size d-dimensional vector, and wherein generation of a second feature vector for each of second subtrees of the second tree comprises:

serializing each of the second subtrees of the second tree into a second respective bag of grams; and for each of the second bags of grams corresponding to the second subtrees of the second tree generating a second fixed-size d-dimensional vector.

18. A computer-implemented method according to claim 13, wherein generating the second mapping comprises:

determining distances between end points of the fixed-size d-dimensional vectors and end points of the second fixed-size d-dimensional vectors.

* * * * *